United States Patent
Meier et al.

(10) Patent No.: US 9,582,276 B2
(45) Date of Patent: Feb. 28, 2017

(54) PROCESSOR AND METHOD FOR IMPLEMENTING BARRIER OPERATION USING SPECULATIVE AND ARCHITECTURAL COLOR VALUES

(71) Applicant: Apple Inc., Cupertino, CA (US)

(72) Inventors: Stephan G. Meier, Los Altos, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 13/629,471

(22) Filed: Sep. 27, 2012

(65) Prior Publication Data
US 2014/0089589 A1    Mar. 27, 2014

(51) Int. Cl.
G06F 9/38 (2006.01)
G06F 9/52 (2006.01)
G06F 9/30 (2006.01)

(52) U.S. Cl.
CPC ........ *G06F 9/30087* (2013.01); *G06F 9/3834* (2013.01); *G06F 9/3838* (2013.01); *G06F 9/3857* (2013.01); *G06F 9/522* (2013.01)

(58) Field of Classification Search
CPC .............................. G06F 9/3834; G06F 9/522
See application file for complete search history.

(56) References Cited

U.S. PATENT DOCUMENTS

| | | | |
|---|---|---|---|
| 5,764,942 A * | 6/1998 | Kahle et al. | 712/214 |
| 5,805,906 A * | 9/1998 | Cheong et al. | 710/260 |
| 5,881,264 A * | 3/1999 | Kurosawa | 712/217 |
| 5,951,670 A | 9/1999 | Glew et al. | |
| 6,006,326 A * | 12/1999 | Panwar et al. | 712/217 |
| 6,625,660 B1 * | 9/2003 | Guthrie et al. | 709/248 |
| 6,880,073 B2 * | 4/2005 | Arimilli et al. | 712/245 |
| 7,200,737 B1 * | 4/2007 | Merchant et al. | 712/218 |

(Continued)

FOREIGN PATENT DOCUMENTS

| | | |
|---|---|---|
| CN | 102103525 A | 6/2011 |
| TW | 201107974 A1 | 3/2011 |

OTHER PUBLICATIONS

Shen and Lipasti, Modern Processor Design, 2003, McGraw Hill, Beta Edition, 9 pages.*

(Continued)

*Primary Examiner* — Andrew Caldwell
*Assistant Examiner* — Jyoti Mehta
(74) *Attorney, Agent, or Firm* — Rory D. Rankin; Meyertons, Hood, Kivlin, Kowert & Goetzel, P.C.

(57) ABSTRACT

Methods and processors for enforcing an order of memory access requests in the presence of barriers in an out-of-order processor pipeline. A speculative color is assigned to instruction operations in the front-end of the processor pipeline, while the instruction operations are still in order. The instruction operations are placed in any of multiple reservation stations and then issued out-of-order from the reservation stations. When a barrier is encountered in the front-end, the speculative color is changed, and instruction operations are assigned the new speculative color. A core interface unit maintains an architectural color, and the architectural color is changed when a barrier retires. The core interface unit stalls instruction operations with a speculative color that does match the architectural color.

24 Claims, 9 Drawing Sheets

(56) References Cited

U.S. PATENT DOCUMENTS

| | | | |
|---|---|---|---|
| 7,689,813 B2* | 3/2010 | Caprioli et al. | 712/219 |
| 2005/0268075 A1* | 12/2005 | Caprioli et al. | 712/239 |
| 2008/0168239 A1* | 7/2008 | Shen et al. | 711/154 |
| 2010/0115249 A1 | 5/2010 | Paltashev et al. | |
| 2010/0169611 A1* | 7/2010 | Chou | G06F 9/3863 712/205 |
| 2011/0208915 A1* | 8/2011 | Bannon et al. | 711/122 |

OTHER PUBLICATIONS

Park et al, Reducing Design Complexity of the Load/Store Queue, Feb. 13, 2005, 9 pages, retrieved from the internet on Sep. 29, 2015, retrieved from URL <http://courses.cs.washington.edu/courses/cse548/05wi/files/inclass/Feb2_LoadStoreQueue.pdf>.*

Computer Basics Explanation of the L1 and L2 cache, Jan. 29, 2010, 4 pages, retrieved from the internet on Sep. 29, 2015, retrieved from URL <http://www.amecomputers.com/explanation-of-the-l1-and-l2-cache.html>.*

Office Action in Taiwan Patent Application No. 102135189, mailed Jan. 13, 2015, 12 pages.

Onder, S "Cost effective memory dependence prediction using speculation levels and color sets", Parallel Architectures and Compilation Techniques, 2002; Institute of Electrical and Electronics Engineers Inc. pp. 232-241.

International Search Report and Written Opinion in application No. PCT/US2013/061827, mailed Feb. 10, 2014, 10 pages.

"Using Level of Conditionality to Monitor Operand Store Compare", IBM Technical Disclosure Bulletin, International Business Machines Corp. (Thornwood), US, vol. 36, No. 1, Jan. 1, 1993, pp. 428-431.

"Multisequencing a Single Instruction Stream—Generalizing the Level Conditionality", IBM Technical Disclosure Bulletin, International Business Machines Corp. (Thornwood), US, vol. 36, No. 5, May 1, 1993, pp. 189-192.

* cited by examiner

PROCESSOR AND METHOD FOR IMPLEMENTING BARRIER OPERATION USING SPECULATIVE AND ARCHITECTURAL COLOR VALUES

BACKGROUND

Field of the Invention

The present invention relates generally to processors, and in particular to methods and mechanisms for maintaining an order of instructions in relation to barriers within a processor.

Description of the Related Art

In modern day processors, instructions may be executed out of order. This may improve processor performance, but it may also result in unintended behavior. For example, a programmer may intend for specific sequences of instructions to execute in order, and if the processor reorders these instructions, unwanted errors may occur as a result. Therefore, to avoid these errors, barrier commands may be inserted into the code to enforce an instruction order. A barrier has a property such that instructions that the barrier controls must not be reordered with respect to the barrier. Therefore, the barrier can be inserted into a stream of instructions to prevent some instructions from being executed before other instructions.

Some processors include multiple independent reservation stations for issuing operations to be executed. It may be difficult to enforce an order for operations issued out of the multiple reservation stations. In other words, keeping track of which operations were before a barrier and which operations were after a barrier can be challenging, especially for operations in a first reservation station when the barrier is in a second reservation station.

SUMMARY

Apparatuses, processors, and methods for enforcing an order of instructions in the vicinity of barriers are disclosed. In an out-of-order processor, barriers may be utilized to enforce an order of execution of a sequence of instructions. When a barrier is encountered in code flow, the barrier may have restrictions on what is and what is not allowed to pass it during execution of the code by the processor. For memory or synchronization barriers, these barriers are executed by the processor and are seen by a load/store unit as a barrier. This barrier may create an invisible wall for subsequent instructions, and these subsequent instructions may not be allowed to pass the barrier.

In one embodiment, a processor may include multiple reservation stations for loads and stores, and instruction operations may be enqueued and issue out-of-order from the reservation stations. A speculative color may be maintained at the front-end of the instruction pipeline, and prior to dispatch, while the instructions are in order, the instructions may be tagged with the speculative color. When a barrier is encountered at the front-end of the instruction pipeline, the speculative color is changed, and subsequent instructions get tagged with the updated speculative color. Then, the barrier may be dispatched to one of the reservation stations, and subsequent instruction operations may get dispatched to any of the reservation stations. The speculative color may be updated each time a barrier is encountered, which allows multiple barriers to be in-flight in the instruction pipeline.

When a load or store operation misses in the L1 cache, the operation may be conveyed to the core interface unit (CIF). The CIF may maintain an architectural color, and this architectural color may be updated when a barrier retires. When an operation is selected to be conveyed by the CIF to the L2 cache, the CIF may compare the speculative color tag of the operation with the architectural color. If the colors match, then the operation may be allowed to proceed to the L2 cache. If the colors do not match, then the operation may be stalled. Later, when the barrier retires, the stalled operations may be restarted and allowed to access the L2 cache. In this way, the correct instruction operation order with regard to one or more in-flight barriers may be maintained.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a dispatch unit . . . " Such a claim does not foreclose the processor from including additional components (e.g., a load/store unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
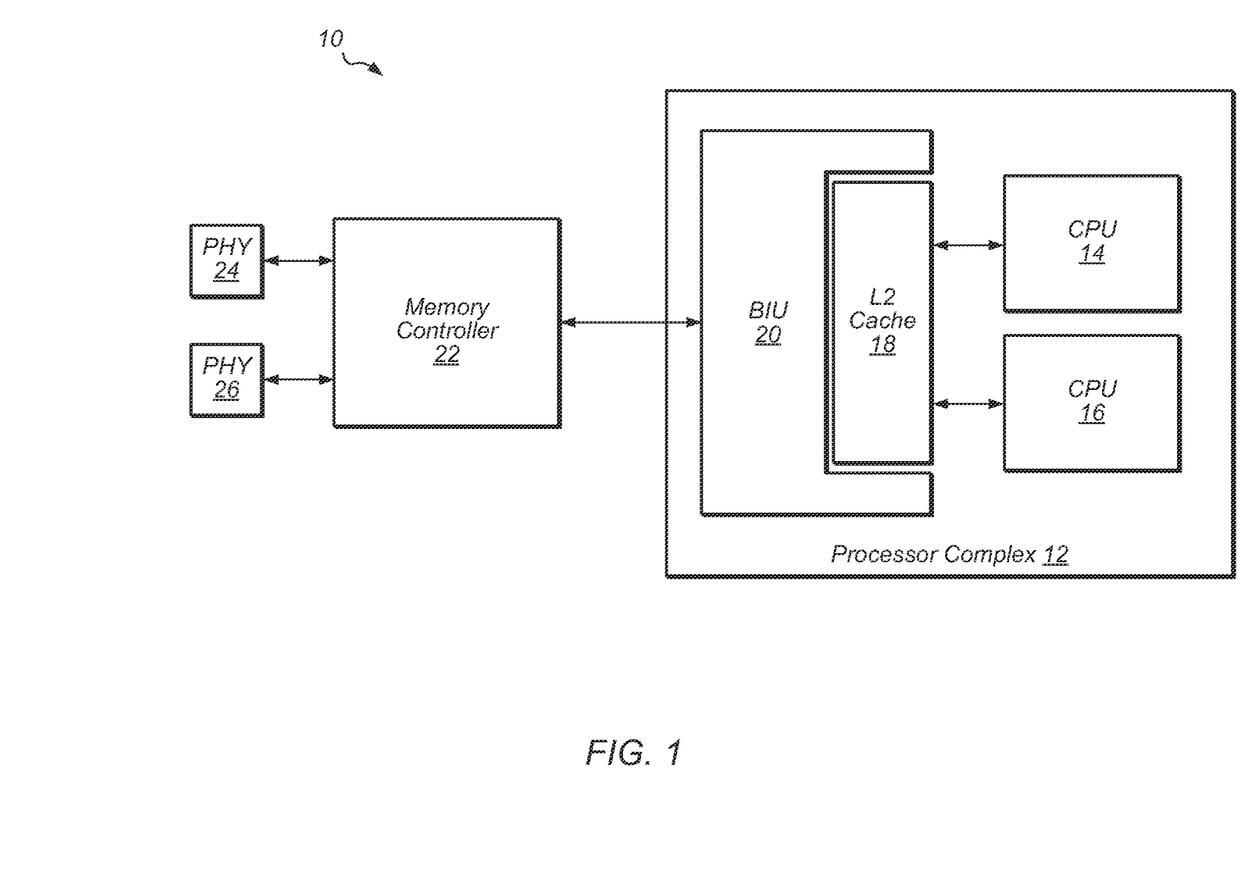
FIG. 1 illustrates one embodiment of a portion of an integrated circuit.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture. Specifically, one or more programs comprising the instructions may be executed by CPUs 14 and 16. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

The caches and memory devices of IC 10 may be referred to collectively as a "memory subsystem". The caches closest to the CPUs 14 and 16 may be referred to as higher-level caches and the caches closest to memory may be referred to as lower-level caches. In various embodiments, barrier operations may be executed and make their way through the higher-level caches to the lower-level caches and then down to memory. At any point in the path of the barrier operation through the memory subsystem, memory access operations may be delayed due to the establishment of the barrier operation. To ensure the proper ordering of memory access operations in relation to a barrier operation, operations may be tagged with a speculative color, which is updated when a barrier operation is detected. An architectural color may also be maintained, and the architectural color may be updated when the barrier operation retires. Operations may be allowed to proceed to lower levels of memory if their tag color matches the architectural color. The use of the color scheme may guarantee that the order of instruction operations with respect to barrier operations is enforced.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
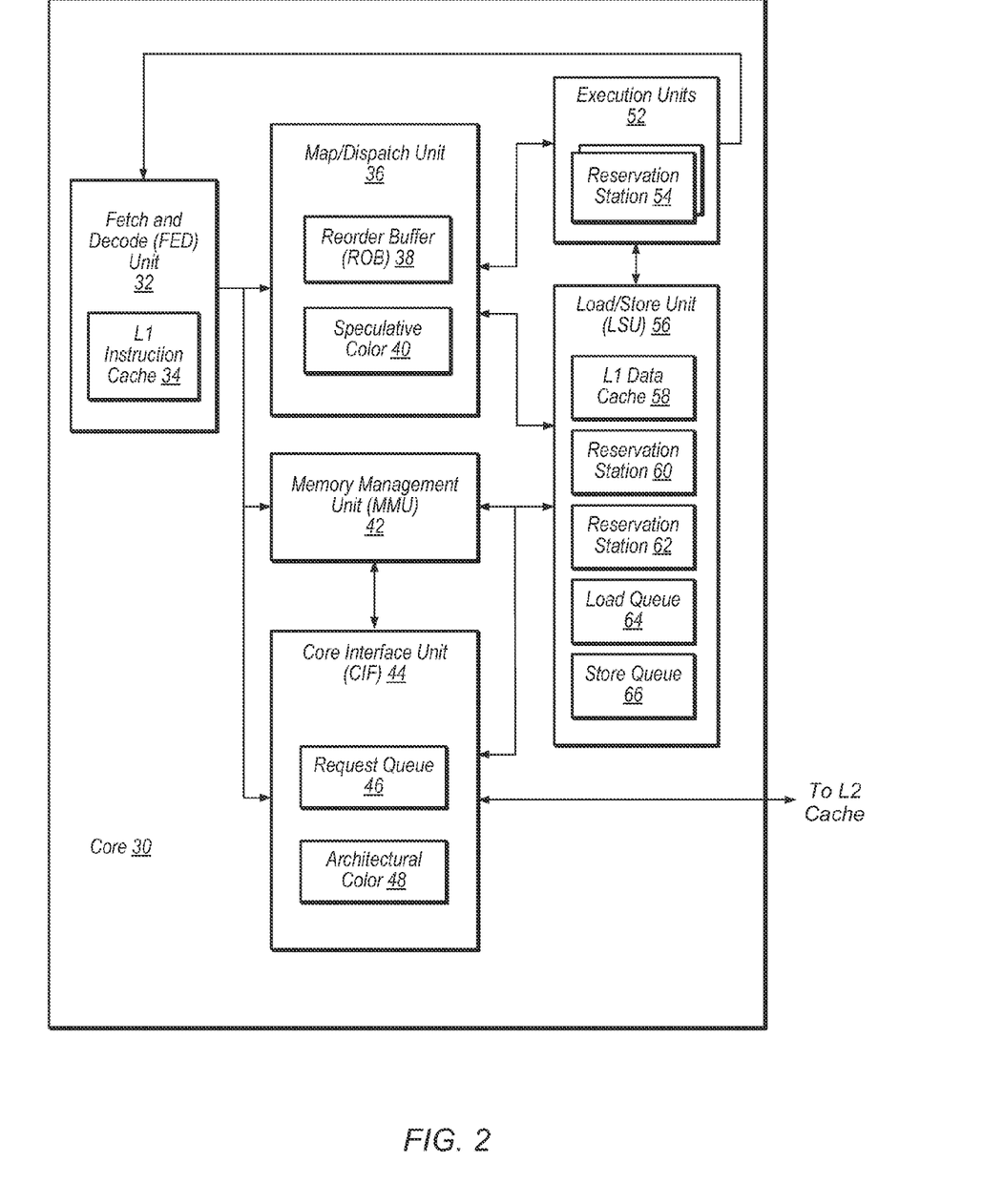
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 42, core interface unit (CIF) 44, execution units 52, and load-store unit (LSU) 56. It is noted that core 30 may include other components and interfaces not shown in FIG. 2.

FED unit 32 may include circuitry configured to read instructions from memory and place them in level one (L1) instruction cache 34. L1 instruction cache 34 may be a cache memory for storing instructions to be executed by core 30. L1 instruction cache 34 may have any capacity and construction (e.g. direct mapped, set associative, fully associative, etc.). Furthermore, L1 instruction cache 34 may have any cache line size. FED unit 32 may also include branch prediction hardware configured to predict branch instructions and to fetch down the predicted path. FED unit 32 may also be redirected (e.g. via misprediction, exception, interrupt, flush, etc.).

FED unit 32 may be configured to decode the instructions into instruction operations. In addition, FED unit 32 may also be configured to decode multiple instructions in parallel. Generally, an instruction operation may be an operation that the hardware included in execution units 52 and LSU 56 is capable of executing. Each instruction may translate to one or more instruction operations which, when executed, result in the performance of the operations defined for that instruction according to the instruction set architecture. It is noted that the terms "operation", "instruction operation", and "uop" may be used interchangeably throughout this disclosure. In other embodiments, the functionality included within FED unit 32 may be split into two or more separate units, such as a fetch unit, a decode unit, and/or other units.

Decoded uops may be provided to map/dispatch unit 36. Map/dispatch unit 36 may be configured to map uops and architectural registers to physical registers of core 30. Map/dispatch unit 36 may implement register renaming to map source register addresses from the uops to the source operand numbers identifying the renamed source registers. Map/dispatch unit 36 may also be configured to dispatch uops to reservation stations within execution units 52 and LSU 56.

Map/dispatch unit 36 may maintain speculative color 40 and dispatched operations may be tagged with the current value of speculative color 40 while the operations are still in order. Prior to detecting a barrier operation, speculative color 40 may be the same value as architectural color 48, which is maintained by CIF 44. Then, when a barrier is detected, speculative color 40 may be changed, and subsequent operations may be tagged with the new speculative color 40. Any operations that have a tagged color that does not match the architectural color 48 may be held up by CIF 44 and prevented from proceeding to the L2 cache. Architectural color 48 may be updated when the barrier operation retires, at which point a wakeup event may be generated to restart any operations waiting for a color change. In some embodiments, map/dispatch unit 36 may maintain a separate speculative color for each thread executing on core 30. In these embodiments, CIF 44 may also maintain a separate architectural color for each thread and a wakeup event may specify a color change and a thread ID.

In one embodiment, map/dispatch unit 36 may include reorder buffer (ROB) 38. In other embodiments, ROB 38 may be located elsewhere. Prior to being dispatched, the uops may be written to ROB 38. ROB 38 may be configured to hold uops until they can be committed in order. Each uop may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

Execution units 52 may include any number and type of execution units (e.g., integer, floating point, vector). Each of execution units 52 may also include one or more reservation stations 54. CIF 44 may be coupled to LSU 56, FED unit 32, MMU 42, and an L2 cache (not shown). MMU 42 may be configured to perform address translation and memory management functions. CIF 44 may be configured to manage the interface between core 30 and the L2 cache for loads, stores, and barriers. CIF 44 may be configured to ensure ordering is maintained between transactions. In one embodiment, CIF 44 may include request queue 46 for storing memory access operations that have missed in L1 instruction cache 34 or L1 data cache 58. A picker (not shown) may be configured to select from request queue 46 for conveying memory access operations to the L2 cache.

LSU 56 may include L1 data cache 58, reservation stations 60 and 62, load queue 64, and store queue 66. Reservation stations 60 and 62 are representative of any number of reservation stations within LSU 56. LSU 56 may also be coupled to the L2 cache via CIF 44. It is noted that LSU 56 may also include other logic not shown in FIG. 2. Load and store operations and barrier operations may be dispatched from map/dispatch unit 36 to either of reservation stations 60 or 62 in LSU 56. The barrier operation may not be launched from LSU 56 to CIF 44 until all older memory access operations are complete in LSU 56. Also, LSU 56 may wait until the barrier operation becomes non-speculative before sending the barrier operation to CIF 44. In the ARM ISA, barrier operations may include data memory barriers (DMBs) and data synchronization barriers (DSBs). In other ISAs, other types of barrier operations may be utilized. Depending on the parameters that are specified for a given barrier operation, the barrier may be applied to store operations only, to load operations only, or to both store and load operations.

In one embodiment, when a younger memory access operation is issued from reservation station 60 or 62 to CIF 44 ahead of a barrier operation, the younger memory access operation may be bounced back to LSU 56. These younger memory access operations may be put into a wait-state in LSU 56 in either load queue 64 or store queue 66. An operation is older than another operation if the operation is prior to the other operation in program order. An operation is younger than another operation if it is subsequent to the other operation in program order. Similarly, operations may be indicated as being prior to or subsequent to other operations, or may be referred to as previous operations, preceding operations, subsequent operations, etc. Such references may refer to the program order of the operations.

Memory access operations, or memory operations, may be a type of instruction operation. In various embodiments, memory operations may be implicitly specified by an instruction having a memory operation, or may be derived from explicit load/store instructions. Furthermore, a "load memory operation" or "load operation" may refer to a transfer of data from memory or cache to a processor, and a "store memory operation" or "store operation" may refer to a transfer of data from a processor to memory or cache. "Load operations" and "store operations" may be more succinctly referred to herein as "loads" and "stores", respectively.

It should be understood that the distribution of functionality illustrated in FIG. 2 is not the only possible microarchitecture which may be utilized for a processor core.

Other processor cores may include other components, omit one or more of the components shown, and/or include a different arrangement of functionality among the components.

Figure 3:
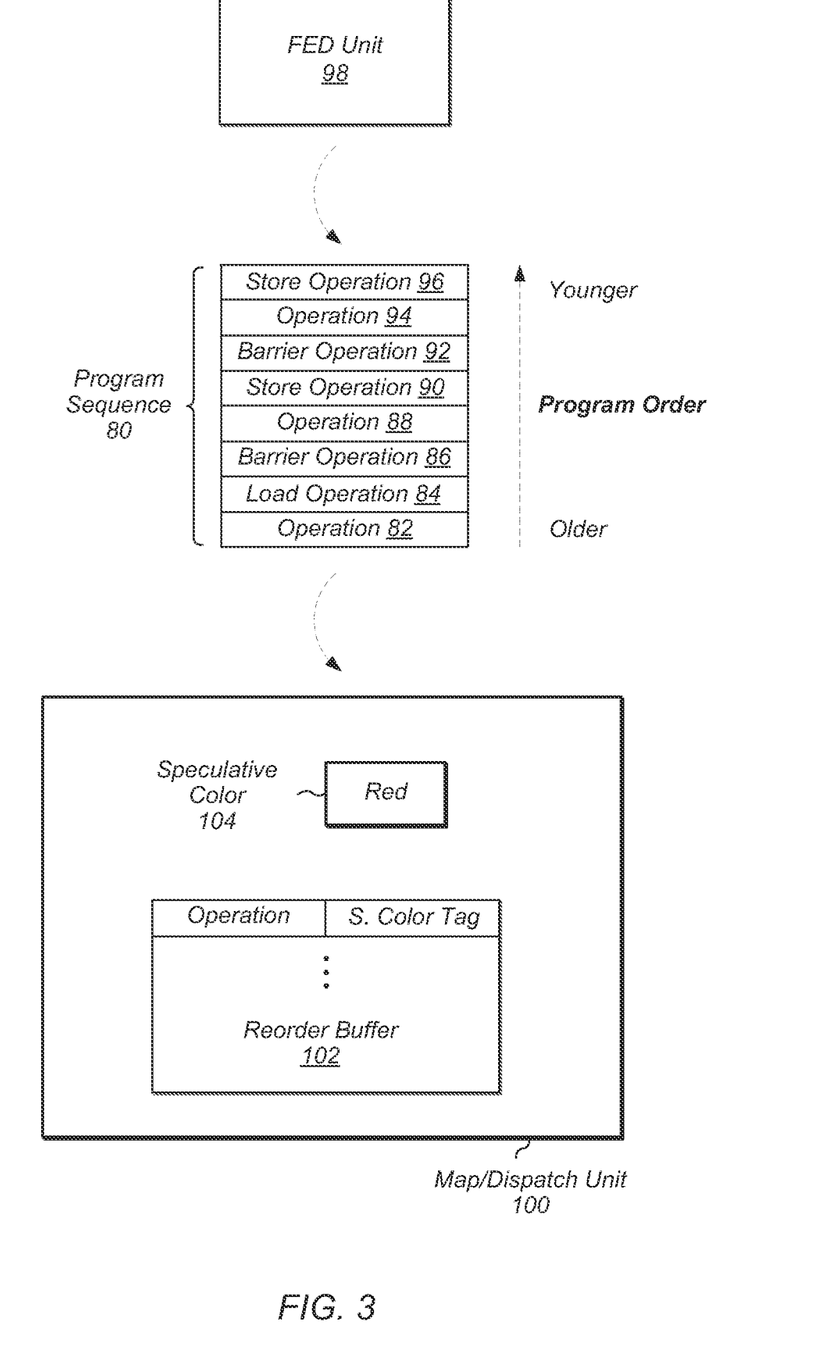
FIG. 3 illustrates one embodiment of a portion of a program sequence.

Referring now to FIG. 3, a block diagram of one embodiment of a portion of a program sequence being conveyed from a FED unit to a map/dispatch unit is shown. FED unit 98 may be configured to fetch instructions and decode the instructions into operations. The operations may then be conveyed to map/dispatch unit 100. It is noted that FED unit 98 and map/dispatch unit 100 represent one example of a processor front-end, and in other embodiments, the processor front-end architecture may include a different arrangement of units.

The program sequence 80 shown in FIG. 3 is for illustrative purposes only and is representative of a portion of a larger program. The program sequence 80 includes operations 82-96. Operations 82, 88, and 94 are representative of any type of operations that are not memory access operations or barrier operations. These operations may ultimately be dispatched to an execution unit (not shown) rather than a load/store unit (not shown). Store operations 84 and 96, load operation 90, and barrier operations 86 and 92 may be dispatched to a load/store unit by map/dispatch unit 100. Barrier operations 86 and 92 are representative of any type of a barrier operation. For example, in one embodiment, each of barrier operations 86 and 92 may be a DMB or DSB as defined by the ARM ISA. In other embodiments, for other ISAs, barrier operations 86 and 92 may be representative of other types of barrier operations.

The oldest operations are shown at the bottom of the program sequence 82, with operation 82 being the oldest operation. The younger operations are shown at the top of the program sequence 82, with store operation 96 being the youngest operation. The operations in program sequence 82 may be assigned a speculative color from speculative color 104 prior to being dispatched from map/dispatch unit 100. Operations may also be identified in reorder buffer 102 and held until they can be committed in order. In one embodiment, reorder buffer 102 may also include the speculative color tag for each operation, while in other embodiments, reorder buffer 102 may not include the speculative color tag. Reorder buffer 102 may also include other fields of information not shown in FIG. 3.

In one embodiment, operations may be tagged with the speculative color 104 by the map/dispatch unit 100 as they are dispatched. In other embodiments, the speculative color 104 may be maintained by another unit and operations may be tagged with the speculative color at another location in the front-end of the processor. In general, any unit in the processor front-end may tag operations at any point at which the operations are still in order. For example, in another embodiment, FED unit 98 may maintain speculative color 104 and tag operations with speculative color 104. The operations may then be sent to the map/dispatch unit 100 with tags indicating the speculative color 104.

In the embodiment shown in FIG. 3, the speculative color 104 is set to red prior to program sequence 80 being conveyed to map/dispatch unit 100. It may also be assumed that the architectural color (not shown) is also set to red at this time. In one embodiment, speculative colors may be represented with a three-bit value. For example, red may be assigned a value of "000". When a barrier operation is encountered, the value may be incremented to "001". When eight barriers have been encountered and the value of "111" is incremented, the value may rollover back to "000". Therefore, for a three-bit speculative color representation, there may be eight different colors that are used to support eight separate in-flight barrier operations. In other embodiments, other numbers of bits may be used to represent the color tag, which may allow other numbers of simultaneous in-flight barrier operations to be supported.

Figure 4:
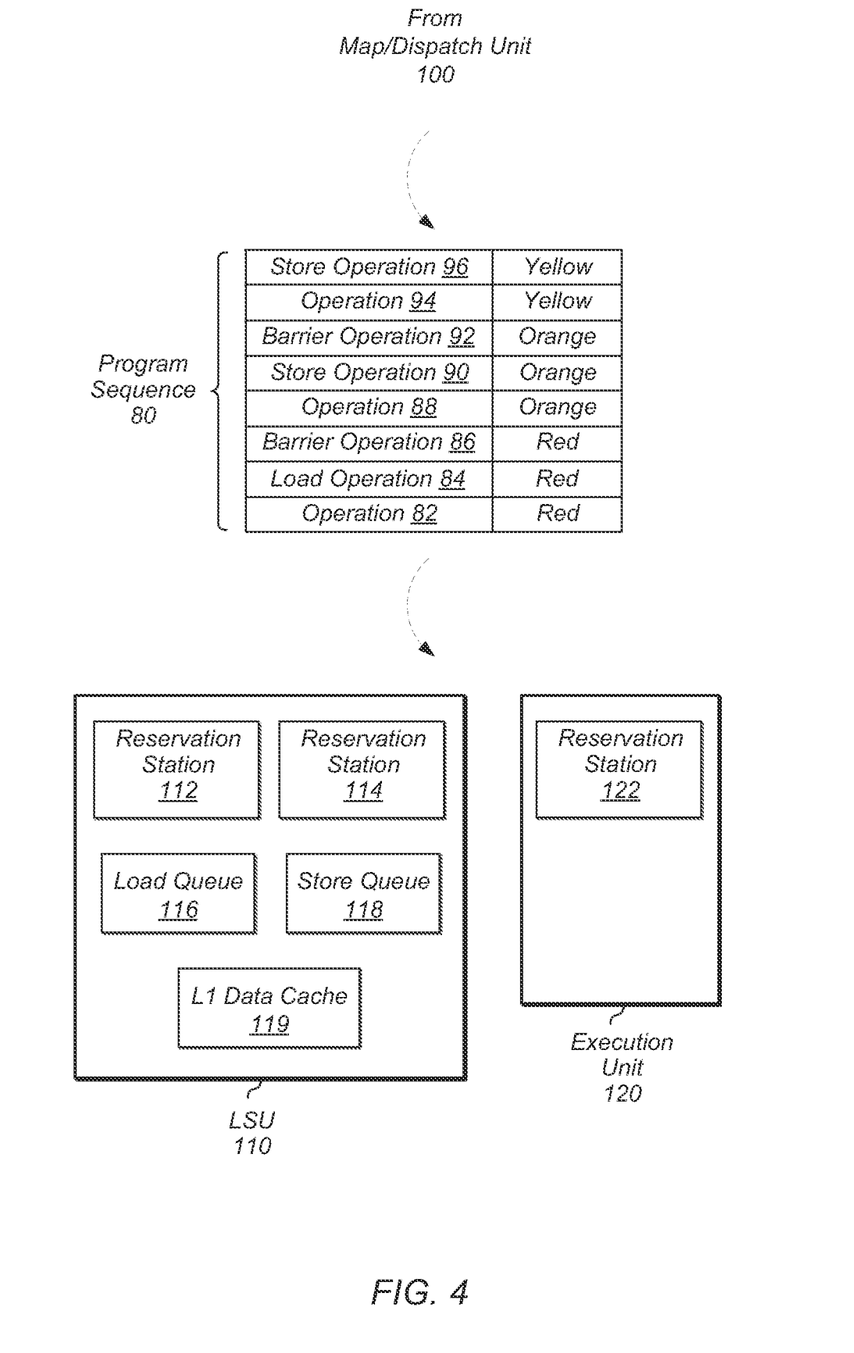
FIG. 4 illustrates one embodiment of a dispatched program sequence.

Turning now to FIG. 4, one embodiment of a dispatched program sequence is shown. FIG. 4 shows a continuation of the example shown in FIG. 3 with program sequence 80 being dispatched by map/dispatch unit 100 to the next stage of the instruction pipeline. As shown in FIG. 4, the program sequence 80 has been tagged with the speculative color and is being dispatched by map/dispatch unit 100 to reservation stations in LSU 110 and execution unit 120.

It will be assumed for the purposes of discussion that at the start of program sequence 80, speculative color 104 (of FIG. 3) was red. Then, after detecting barrier operation 86, the speculative color 104 may be changed to orange. Barrier operation 86 may get tagged with the color of red before speculative color 104 is changed to orange. Then, when barrier operation 92 is detected, speculative color 104 may be changed from orange to yellow. In other embodiments, the sequence of colors may differ. Also, it may be assumed that the colors red, orange, and yellow may be represented by "000", "001", and "010", although the actual bit values used to represent colors may vary in other embodiments. When the colors are specified as bit values, changing the color may also be referred to as incrementing the color.

Operation 82 and store operation 84 may be tagged with red since they were dispatched prior to barrier operation 86. Operation 88, load operation 90, and barrier operation 92 may be tagged with orange, and operation 94 and store operation 96 may be tagged with yellow. Operations 82, 88, and 94 may be dispatched to reservation station 122 in execution unit 120. It is noted that execution unit 120 is representative of any number of execution units within the processor core and reservation station 122 is representative of any number of reservation stations. In another embodiment, operations 82, 88, and 94 may not be tagged with speculative color 104 since they are not loads or stores. In this embodiment, only loads and stores may be tagged with speculative color 104.

Load operation 84, barrier operation 86, store operation 90, barrier operation 92, and store operation 96 may be dispatched to LSU 110. These operations may be dispatched individually to reservation station 112 or 114. LSU 110 may also include load queue 116, store queue 118, and L1 data cache 119. It is noted that by tagging these operations with the speculative color, the order of the operations with respect to the barrier operations may be identified regardless of which reservation station the operations are sent to. For example, in one embodiment, barrier operation 86 may be sent to reservation station 112 and store operation 90 may be sent to reservation station 114. Although store operation 90 is younger than barrier operation 86, store operation 90 may be issued out of reservation station 114 prior to barrier operation 86 being issued out of reservation station 112. However, the tagging of store operation 90 with the speculative color of orange may prevent store operation 90 from executing until after barrier operation 86 has been retired and the architectural color (not shown) is changed from red to orange.

Figure 5:
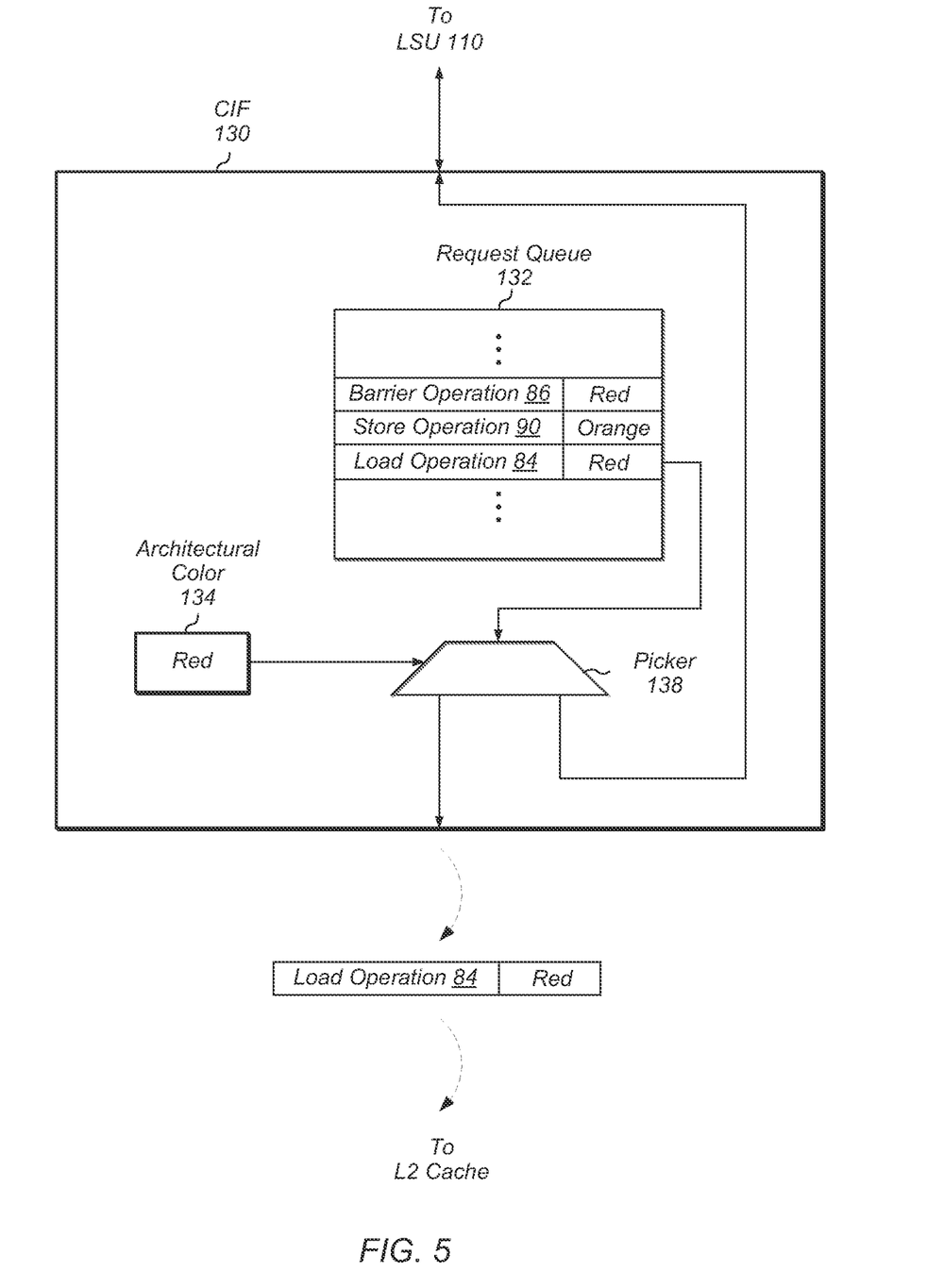
FIG. 5 is a block diagram that illustrates one embodiment of a core interface unit.

Referring now to FIG. 5, a block diagram of one embodiment of a core interface unit (CIF) is shown. The example illustrated in FIG. 5 is a continuation of the path of program sequence 80 through the processor pipeline. It will be assumed for the purposes of this discussion that load operation 84 and store operation 90 both missed in L1 data cache 119 (of FIG. 4) and were conveyed by LSU 110 to CIF 130. It is further assumed that LSU 110 also conveyed barrier operation 86 to CIF 130.

CIF 130 may enqueue load operation 84, store operation 90, and barrier operation 86, along with their speculative color tags, in request queue 132. Although not shown in FIG. 5, request queue 132 may be implemented as more than one memory structure (e.g., address array, data array, order matrix). For example, an order matrix may maintain an order of the requests received by CIF 130 and stored in request queue 132. In addition to receiving operations from LSU 110, CIF 130 may also receive requests from a memory management unit (MMU) (not shown) and a fetch and decode unit (not shown).

Picker 138 may be configured to select operations from request queue 132 and convey operations to the L2 cache (not shown). As shown, picker 138 has selected load operation 84, and since the color (red) of load operation 84 matches the architectural color 134 (red) maintained by CIF 130, load operation 84 may be allowed to proceed to the L2 cache. In one embodiment, if a load operation has a color mismatch between its tag and the architectural color 134, then the load operation may be sent back to LSU 110. In another embodiment, if a load operation is rejected by CIF 130 due to a color mismatch, the load operation may be converted into a prefetch request. The prefetch request may cause data to be retrieved from the L2 cache, lower levels of cache, or main memory, and then the data may be placed in L1 data cache 119.

Any rejected operations that were sent back to LSU 110 may be reactivated once the barrier operation that caused the color mismatch has retired. When the barrier operation has retired, then the architectural color of the CIF 130 may be updated, and then the memory access operations that were previously rejected may be restarted and may be replayed.

It is noted that in other embodiments, the entries in request queue 132 may include one or more fields of data in addition to the operation and speculative color tag. For example, in one embodiment, the entries in request queue 132 may include a L2 cache command, memory attribute, and/or information identifying the source of the request (e.g., MMU, LSU, FED).

Figure 6:
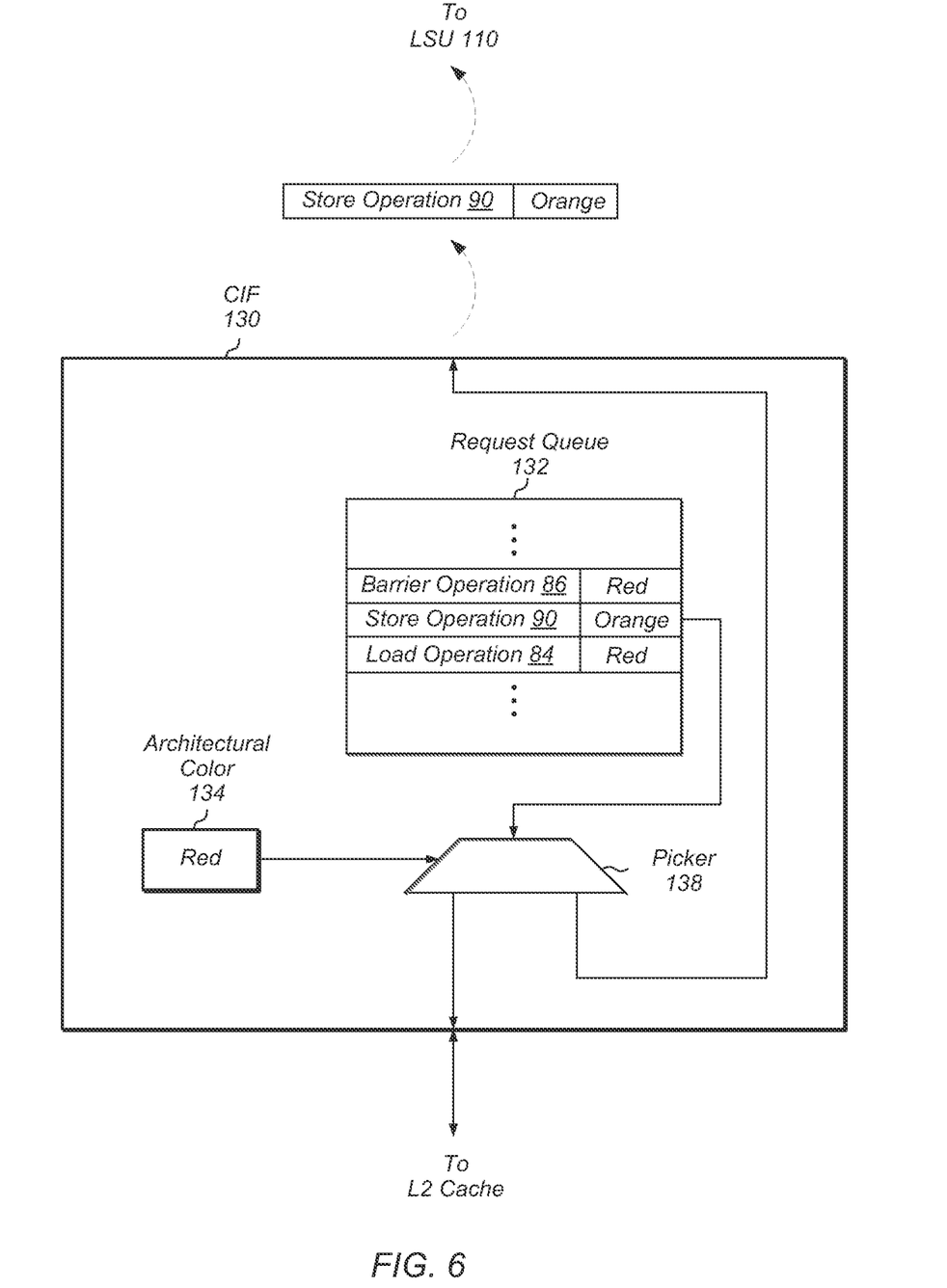
FIG. 6 is a block diagram that illustrates another embodiment of the core interface unit in a subsequent clock cycle.

Turning now to FIG. 6, a block diagram of another embodiment of CIF 130 in a subsequent clock cycle is shown. After selecting load operation 84 in a previous clock cycle (as shown in FIG. 5), picker 138 may select store operation 90 as the next-in-line operation to be processed. When store operation 90 is selected by picker 138, picker 138 may reject store operation 90 by comparing its speculative color tag (orange) to the current architectural color (red) established for CIF 130. In this case, the colors will not match, and therefore store operation 90 may be rejected and sent back to store queue 118 of LSU 110. Later on, when barrier operation 86 retires and architectural color 134 is updated to orange, a wake-up event may be sent to LSU 110. When LSU 110 receives the wake-up event, any stalled operations may be restarted and replayed through LSU 110. This will include store operation 90, which may be woken up and sent back to CIF 130. At this time, since the architectural color 134 will have changed to orange, store operation 90 may be selected by picker 138 and allowed to proceed to the L2 cache. It is noted that other memory access operations with a color mismatch may be treated in a similar manner as store operation 90.

In some embodiments, certain memory access operations may be allowed to proceed past an established barrier operation, depending on the specific type of barrier operation that was established. For example, a barrier operation may be established for load operations only, and therefore only subsequent load operations may be rejected in this case. If a store operation were to follow this type of barrier operation, then the store operation would be allowed to proceed to the L2 cache. To handle these types of barrier operations, the processor architecture may maintain a speculative load color and an architectural load color as well as a speculative store color and an architectural store color. Loads may be tagged with the speculative load color while stores may be tagged with the speculative store color. When a barrier that applies to load operations only is detected, the speculative load color may change while the speculative store color may stay the same. Then when this barrier retires, the architectural load color may be updated. For barriers that apply to both loads and stores, these barriers may cause both the speculative load color and the speculative store color to be updated.

Furthermore, other types of barriers, such as load acquires and store releases, may be utilized. A load acquire allows older memory access operations to occur after the load acquire but prevents younger memory access operations from being made visible before the load acquire. A store release does not allow older memory access operations to occur after the store release but allows younger memory access operations to be made visible before the store release. If a load acquire is encountered, the speculative color may be changed back at the map/dispatch unit as already described. However, if a store release is detected, the speculative color may not change, and younger memory access operations may be allowed to proceed past the store release.

Figure 7:
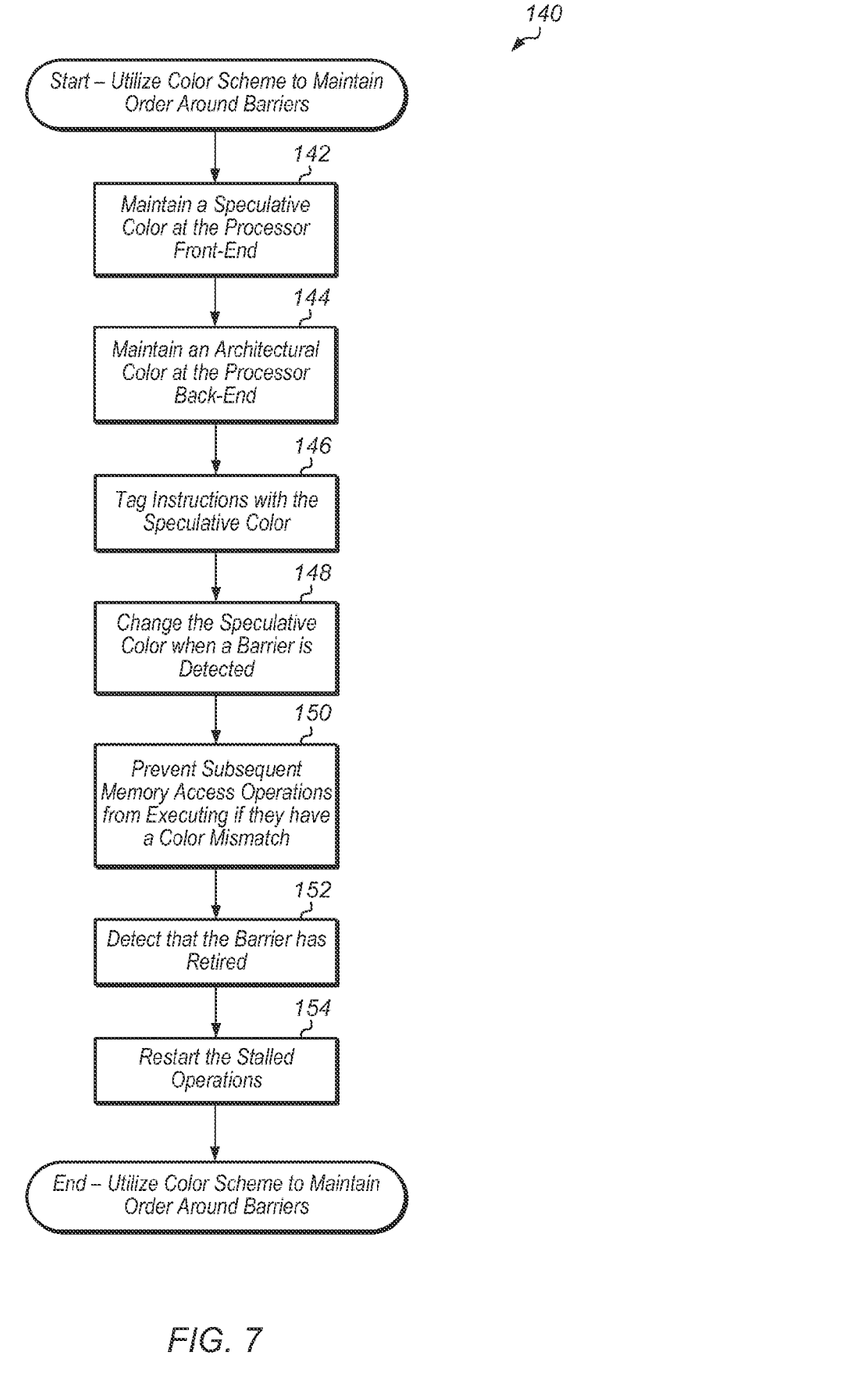
FIG. 7 is a generalized flow diagram illustrating one embodiment of a method for utilizing a color scheme to maintain an order of instructions around barriers.

Referring now to FIG. 7, one embodiment of a method 140 for utilizing a color scheme to maintain an order of instructions around barriers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A speculative color may be maintained at the front-end of a processor instruction pipeline (block 142). In one embodiment, the speculative color may be maintained by a map/dispatch unit. In other embodiments, the speculative color may be maintained by another unit in the front-end of the instruction pipeline (e.g., fetch unit, decode unit, load/store unit). Additionally, an architectural color may be maintained by the back-end of the processor instruction pipeline (block 144). In one embodiment, the architectural color may be maintained by a core interface unit (CIF). In other embodiments, the architectural color may be maintained by another unit in the back-end of the instruction pipeline.

Instructions may be tagged with the speculative color as the instructions traverse the front-end of the instruction pipeline (block 146). The instructions may be tagged while they are still in-order. In one embodiment, instructions may be tagged with the speculative color prior to the instructions being dispatched by the map/dispatch unit to a reservation station within the load/store unit. In other embodiments, instructions may be tagged at another location of the front-end of the instruction pipeline.

When a barrier operation is detected in the instruction stream, the speculative color may be changed (block 148). The barrier operation may be tagged with the old speculative color, but subsequent operations may get tagged with the new speculative color. Any subsequent memory access operations that are tagged with the new speculative color may be prevented from executing if there is a color mismatch between their speculative color tag and the architectural color (block 150). In one embodiment, the operations with a color mismatch may be stalled and prevented from proceeding to lower levels of cache.

Eventually, the barrier operation will retire (block 152). In response to detecting the retirement of the barrier operation, the stalled memory access operations may be restarted and allowed to execute (block 154). After block 154, method 140 may end. While method 140 is described as being implemented for a single barrier operation, it is noted that method 140 may be performed concurrently for any number of barrier operations.

In various embodiments, the mechanism which prevents a memory access operation from executing due to a color mismatch may vary depending on the specific type of processor micro-architecture being utilized. In one embodiment, the memory access operation may be rejected by a core interface unit (CIF) due to a color mismatch. The rejected memory access operations may be a store or load which had previously missed in the L1 data cache. The memory access operation may be rejected by the CIF and bounced back to the load/store unit. Then, the memory access operation may wait in the load queue (for loads) or in the store queue (for stores) until a color change event occurs. When a color change event occurs, a wake-up event may be sent to the load/store unit and the rejected operation may wake up and be replayed. If the replayed operation misses in the L1 cache and is conveyed to the CIF, this time the operation should be able to proceed to the L2 cache because the architectural color should match the color of the operation. In some cases, with multiple in-flight barriers, a rejected operation may need to wait for more than one barrier operation to retire before being able to pass through the CIF on the way to the L2 cache.

Figure 8:
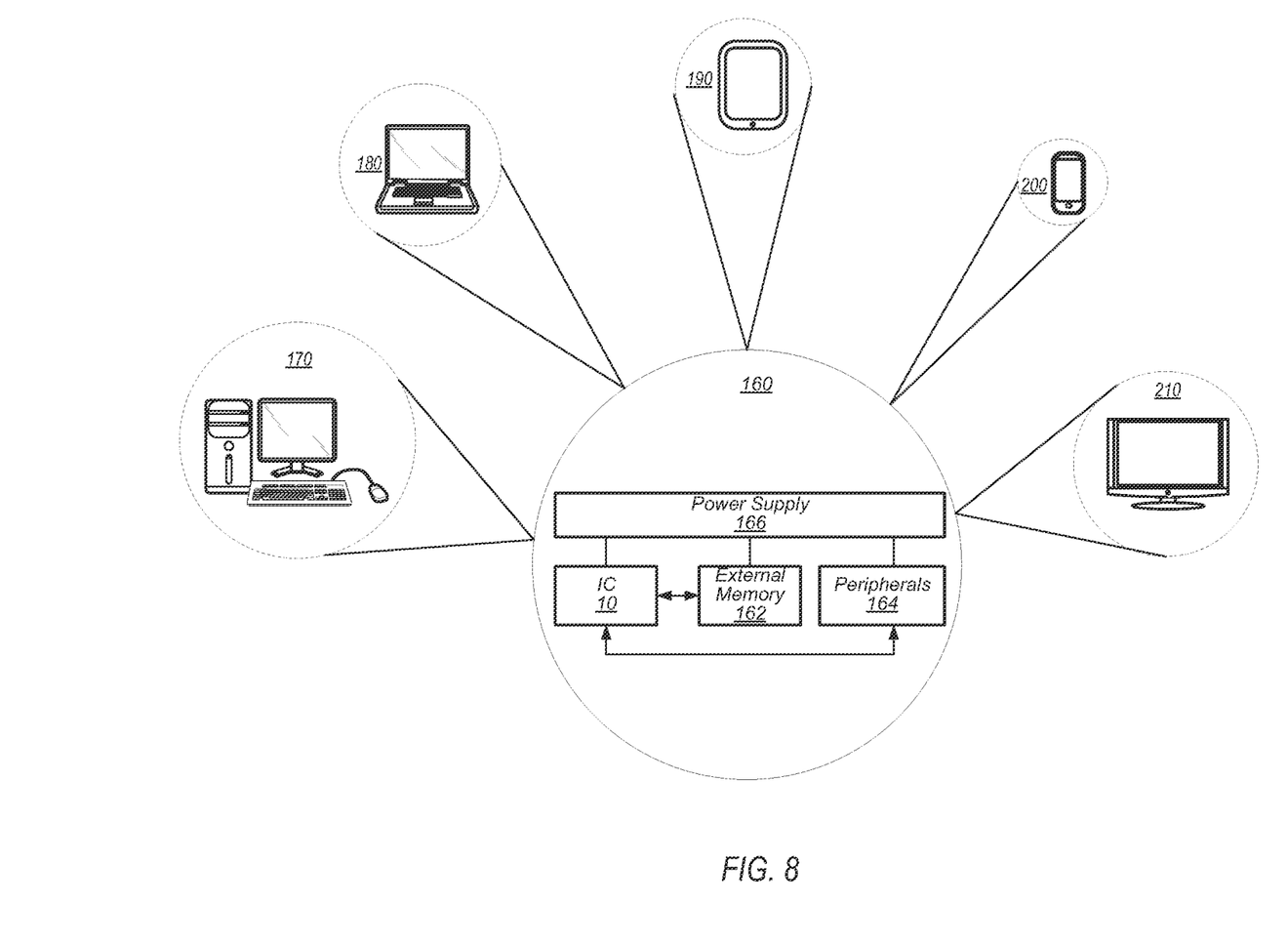
FIG. 8 is a block diagram of one embodiment of a system.

Turning next to FIG. 8, a block diagram of one embodiment of a system 160 is shown. As shown, system 160 may represent chip, circuitry, components, etc., of a desktop computer 170, laptop computer 180, tablet computer 190, cell phone 200, television 210 (or set top box configured to be coupled to a television), or otherwise. In the illustrated embodiment, the system 160 includes at least one instance of IC 10 (of FIG. 2) coupled to an external memory 162.

IC 10 is coupled to one or more peripherals 164 and the external memory 162. A power supply 166 is also provided which supplies the supply voltages to IC 10 as well as one or more supply voltages to the memory 162 and/or the peripherals 164. In various embodiments, power supply 166 may represent a battery (e.g., a rechargeable battery in a smart phone, laptop or tablet computer). In some embodiments, more than one instance of IC 10 may be included (and more than one external memory 162 may be included as well).

The memory 162 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 164 may include any desired circuitry, depending on the type of system 160. For example, in one embodiment, peripherals 164 may include devices for various types of wireless communication, such as wifi, Bluetooth, cellular, global positioning system, etc. The peripherals 164 may also include additional storage, including RAM storage, solid state storage, or disk storage. The peripherals 164 may include user interface devices such as a display screen, including touch display screens or multi-touch display screens, keyboard or other input devices, microphones, speakers, etc.

Figure 9:
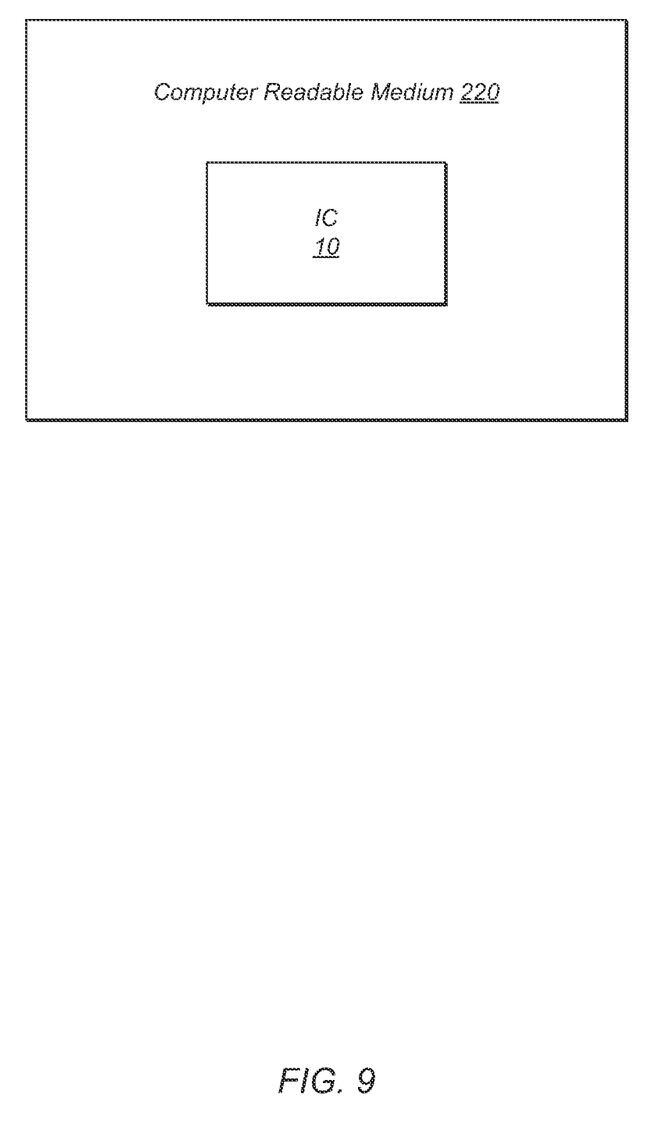
FIG. 9 is a block diagram of one embodiment of a computer readable medium.

Referring now to FIG. 9, one embodiment of a block diagram of a computer readable medium 220 including one or more data structures representative of the circuitry included in IC 10 (of FIG. 1) is shown. Generally speaking, computer readable medium 220 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 220 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 220 may be the netlist(s) (with or without the synthesis library) or the data set(s), as desired. In yet another alternative, the data structures may comprise the output of a schematic program, or netlist(s) or data set(s) derived therefrom.

While computer readable medium 220 includes a representation of IC 10, other embodiments may include a representation of any portion or combination of portions of IC 10 (e.g., core interface unit, load/store unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a dispatch unit comprising circuitry configured to:
   maintain a speculative color value;
   dispatch instruction operations in order, wherein each instruction operation is tagged by the dispatch unit with the speculative color value; and
   change the speculative color value to a new speculative color value in response to each detection of a barrier operation, wherein each barrier operation is tagged by the dispatch unit with the speculative color value prior to the speculative color value being changed to the new speculative color value; and
a core interface unit comprising circuitry configured to:
maintain an architectural color value;
in response to determining a given barrier operation has retired, change the architectural color value to the new speculative color value;
receive instruction operations;
compare the architectural color value with speculative color values of the received instruction operations;
in response to determining the architectural color value matches the speculative color values of the received instruction operations, permit execution of the received instruction operations; and
in response to determining the architectural color value does not match the speculative color values of the received instruction operations, prevent execution of the received instruction operations.

2. The processor as recited in claim 1, wherein in response to detecting a load operation with a speculative color value that does not match the architectural color value, the core interface unit is configured to convert the load operation into a prefetch request.

3. The processor as recited in claim 1, wherein the speculative color value comprises an N bit value, where N is an integer, and wherein the dispatch unit is configured to change the speculative color value by incrementing the N bit value.

4. The processor as recited in claim 1, further comprising a store queue, wherein the given barrier operation is stored in the store queue until retired.

5. The processor as recited in claim 4, wherein the core interface unit is further configured to convey rejected store instruction operations back to the store queue.

6. The processor as recited in claim 5, wherein the core interface unit is configured to convey a wake-up event to the store queue in response to determining the given barrier operation has retired, and wherein rejected store instruction operations are replayed in response to receiving the wake-up event.

7. The processor as recited in claim 1, wherein the barrier operation is a data memory barrier (DMB) or a data synchronization barrier (DSB).

8. A processor comprising:
a load store unit;
dispatch unit comprising circuitry configured to:
maintain a speculative color value;
dispatch instruction operations, including memory access instruction operations, into an out-of-order execution pipeline;
assign the speculative color value to each dispatched memory access instruction operation;
change the speculative color value to a new speculative color value in response to each detection of a barrier operation, wherein each barrier operation is tagged by the dispatch unit with the speculative color value prior to the speculative color value being changed to the new speculative color value; and
a core interface unit comprising circuitry configured to:
maintain an architectural color value;
receive instruction operations;
compare the architectural color value with speculative color values of the received instruction operations;
in response to determining the architectural color value matches the speculative color values of the received instruction operations, permit execution of the received instruction operations;
in response to determining a given barrier operation has retired, change the architectural color value to the new speculative color value;
in response to determining the architectural color value does not match the speculative color values of the received instruction operations, prevent memory access instruction operations of the received instruction operations from executing prior to the given barrier operation retiring; and
convey memory access operations that have been prevented from executing to the load store unit.

9. The processor as recited in claim 8, wherein memory access instruction operations are dispatched by the dispatch unit to multiple reservation stations in the load store unit.

10. The processor as recited in claim 8, wherein the speculative color value comprise an N bit value, where N is an integer, and wherein the dispatch unit is configured to change the speculative color value by incrementing the N bit value.

11. The processor as recited in claim 8, wherein in response to detecting a load operation with a speculative color value that does not match the architectural color value, the core interface unit is configured to convert the load operation into a prefetch request.

12. The processor as recited in claim 8, wherein responsive to a given memory access operation missing in a level one (L1) cache, the processor is configured to prevent the given memory access operation from accessing a level two (L2) cache responsive to detecting a speculative color value of the given memory access operation does not match the architectural color value.

13. A method comprising:
maintaining a speculative color value and an architectural color value;
tagging memory access instruction operations with the speculative color value;
changing the speculative color value to a new speculative color value responsive to detecting a barrier operation, wherein the barrier operation is tagged with the speculative color value prior to the speculative color value being changed to the new speculative color value;
comparing the architectural color value with speculative color values of the memory access instruction operations;
in response to determining the architectural color value matches a speculative color value of a given memory access instruction, permitting execution of the given memory access instruction operation;
in response to determining the architectural color value does not match the speculative color value of the given memory access instruction, preventing the given memory access instruction operation from executing; and
changing the architectural color value to the new speculative color value responsive to detecting the barrier operation has retired.

14. The method as recited in claim 13, further comprising converting a load operation into a prefetch request in response to detecting the load operation has a speculative color value that does not match the architectural color value.

15. The method as recited in claim 14, further comprising replaying the given memory access instruction operation responsive to detecting the barrier operation has retired.

16. The method as recited in claim 14, further comprising dispatching the barrier operation to a given reservation station of a plurality of reservation stations in a load/store unit.

17. The method as recited in claim 16, further comprising issuing the barrier operation from the given reservation station to a core interface unit.

18. The method as recited in claim 13, wherein the speculative color value comprise an N bit value, where N is an integer, and wherein the method further comprises changing the speculative color value by incrementing the N bit value.

19. The method as recited in claim 18, wherein the architectural color value is maintained in a core interface unit.

20. A method comprising:
dispatching a first instruction operation with a tag set to a speculative color, wherein the speculative color is a first color;
changing the speculative color from the first color to a second color responsive to detecting a first barrier operation, wherein the first barrier operation is tagged with the first color prior to the speculative color value being changed to the second color;
dispatching a second instruction operation with a tag set to the speculative color; and
converting the second instruction operation to a prefetch request responsive to detecting the tag of the second instruction operation is not equal to an architectural color, wherein the architectural color is the first color.

21. The method as recited in claim 20, further comprising:
changing the speculative color from the second color to a third color responsive to detecting a second barrier operation, wherein the second barrier operation is tagged with the second color;
dispatching a third instruction operation with a tag set to the speculative color;
comparing the architectural color with speculative colors of dispatched instruction operations;
preventing the second instruction operation from executing until the architectural color is equal to the second color; and
preventing the third instruction operation from executing until the architectural color is equal to the third color.

22. The method as recited in claim 21, further comprising:
changing the architectural color to the second color responsive to detecting the first barrier operation has retired; and
changing the architectural color to the third color responsive to detecting the second barrier operation has retired.

23. The method as recited in claim 22, wherein preventing the second instruction operation from executing comprises stalling the second instruction operation, the method further comprising restarting the second instruction operation responsive to detecting the architectural color has changed to the second color.

24. The method as recited in claim 23, wherein preventing the third instruction operation from executing comprises stalling the third instruction operation, further comprising restarting the third instruction operation responsive to detecting the architectural color has changed to the third color.

\* \* \* \* \*